United States Patent
Thakar

(10) Patent No.: US 11,985,105 B2
(45) Date of Patent: *May 14, 2024

(54) TECHNIQUES FOR DIRECTING A DOMAIN NAME SERVICE (DNS) RESOLUTION PROCESS

(71) Applicant: VeriSign, Inc., Reston, VA (US)

(72) Inventor: Sameer Thakar, Leesburg, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,952

(22) Filed: Mar. 24, 2022

(65) Prior Publication Data

US 2022/0217112 A1  Jul. 7, 2022

Related U.S. Application Data

(63) Continuation of application No. 17/028,616, filed on Sep. 22, 2020, now Pat. No. 11,316,819, which is a
(Continued)

(51) Int. Cl.
*H04L 61/10* (2022.01)
*H04L 61/4511* (2022.01)

(52) U.S. Cl.
CPC .......... *H04L 61/10* (2013.01); *H04L 61/4511* (2022.05)

(58) Field of Classification Search
CPC .............................. H04L 61/10; H04L 61/4511
See application file for complete search history.

(56) References Cited

U.S. PATENT DOCUMENTS 5,721,827 A  2/1998 Logan et al.
6,119,143 A  9/2000 Dias et al.
(Continued)

FOREIGN PATENT DOCUMENTS

EP  3 035 650 A3  6/2016
EP  2579539 B1  12/2018
(Continued)

OTHER PUBLICATIONS

Anonymous: RSSAC-001, "Service Expectations of Root Servers", XP055273350, Retrieved from the Internet: URL: ittps://www.icann.org/en/systemlfiles/files/rssac-001-rafl-02may13-en.pdf [retrieved on May 18, 2016], sections 3.8.2 and 4, May 2, 2013, pp. 1-10.
(Continued)

*Primary Examiner* — Gil H. Lee
(74) *Attorney, Agent, or Firm* — McCarter & English, LLP; Michael A. Sartori

(57) ABSTRACT

In one embodiment, a privacy and security engine enables a user to specify a recursive resolver for a domain name service (DNS) resolution process. The privacy and security engine receives default DNS settings that specify a default recursive resolver to be implemented as a recursive resolver for the DNS resolution process. The default DNS settings are provided by an underlying mobile operator network to which the user device is connected. The privacy and security engine causes the user device to disregard the default DNS settings and implement customized DNS settings that specify a preferred recursive resolver to be implemented as the recursive resolver for the DNS resolution process. The customized DNS settings are associated with an activated privacy and security mode. Unlike conventional approaches to overriding DNS settings, the user is able to specify the recursive resolver that implements the DNS resolution process irrespective of the underlying network.

69 Claims, 3 Drawing Sheets

Related U.S. Application Data continuation of application No. 15/348,905, filed on Nov. 10, 2016, now Pat. No. 10,791,085.

(60) Provisional application No. 62/254,308, filed on Nov. 12, 2015.

(56) References Cited

U.S. PATENT DOCUMENTS

| | | | |
|---|---|---|---|
| 6,154,777 A | 11/2000 | Ebrahim | |
| 6,338,082 B1 | 1/2002 | Schneider | |
| 6,480,508 B1* | 11/2002 | Mwikalo | H04L 61/59 709/245 |
| 6,560,634 B1 | 5/2003 | Broadhurst | |
| 6,678,717 B1 | 1/2004 | Schneider | |
| 6,684,250 B2 | 1/2004 | Anderson et al. | |
| 6,728,767 B1 | 4/2004 | Day et al. | |
| 6,769,028 B1 | 7/2004 | Sass et al. | |
| 6,839,421 B2 | 1/2005 | Ferraro Esparaza et al. | |
| 7,136,932 B1 | 11/2006 | Schneider | |
| 7,152,118 B2 | 12/2006 | Anderson, IV et al. | |
| 7,299,491 B2 | 11/2007 | Shelest et al. | |
| 7,367,046 B1 | 4/2008 | Sukiman et al. | |
| 7,386,849 B2 | 6/2008 | Dageville et al. | |
| 7,533,266 B2 | 5/2009 | Bruekers et al. | |
| 7,542,468 B1 | 6/2009 | Begley et al. | |
| 7,565,402 B2 | 7/2009 | Schneider | |
| 7,650,331 B1 | 1/2010 | Dean et al. | |
| 7,720,057 B2 | 5/2010 | Igarashi | |
| 7,725,536 B2 | 5/2010 | Douglis et al. | |
| 7,796,978 B2 | 9/2010 | Jones et al. | |
| 7,864,709 B2 | 1/2011 | Cheshire | |
| 7,895,319 B2 | 2/2011 | Statia et al. | |
| 7,917,616 B2 | 3/2011 | Trace et al. | |
| 7,984,149 B1 | 7/2011 | Grayson | |
| 7,991,910 B2 | 8/2011 | Richardson et al. | |
| 8,037,168 B2 | 10/2011 | Schneider | |
| 8,224,994 B1 | 7/2012 | Schneider | |
| RE43,690 E | 9/2012 | Schneider et al. | |
| RE44,207 E | 5/2013 | Schneider | |
| 8,447,856 B2 | 5/2013 | Drako | |
| 8,468,251 B2 | 6/2013 | Boesgaard Sorensen | |
| 8,489,637 B2 | 7/2013 | Palti | |
| 8,521,908 B2 | 8/2013 | Holmes et al. | |
| 8,655,307 B1 | 2/2014 | Walker et al. | |
| 8,990,356 B2 | 3/2015 | McPherson et al. | |
| 9,015,323 B2 | 4/2015 | Kommula | |
| 9,473,516 B1 | 10/2016 | Jezorek et al. | |
| 10,169,571 B1 | 1/2019 | Attfield et al. | |
| 10,270,755 B2 | 4/2019 | McPherson et al. | |
| 10,530,734 B2 | 1/2020 | Kaliski, Jr. et al. | |
| 10,791,085 B2 | 9/2020 | Thakar | |
| 10,819,697 B1 | 10/2020 | McPherson et al. | |
| 10,999,240 B1 | 5/2021 | Osterweil et al. | |
| 11,082,392 B1 | 8/2021 | Kaliski, Jr. et al. | |
| 11,316,819 B1 | 4/2022 | Thakar | |
| 2001/0042109 A1 | 11/2001 | Bolas et al. | |
| 2002/0073335 A1 | 6/2002 | Shuster | |
| 2002/0099952 A1 | 7/2002 | Lambert et al. | |
| 2002/0161745 A1* | 10/2002 | Call | G06Q 30/02 |
| 2003/0103645 A1 | 6/2003 | Levy et al. | |
| 2003/0177240 A1 | 9/2003 | Gulko et al. | |
| 2003/0182447 A1 | 9/2003 | Schilling | |
| 2004/0039798 A1 | 2/2004 | Hotz et al. | |
| 2004/0044791 A1 | 3/2004 | Pouzzner | |
| 2004/0128514 A1 | 7/2004 | Rhoads | |
| 2004/0194102 A1 | 9/2004 | Neerdaels | |
| 2004/0210672 A1 | 10/2004 | Pulleyn et al. | |
| 2005/0044352 A1 | 2/2005 | Pazi et al. | |
| 2005/0259645 A1 | 11/2005 | Chen et al. | |
| 2006/0056371 A1* | 3/2006 | Sakuda | H04L 63/083 370/338 |
| 2006/0088039 A1 | 4/2006 | Kakivaya et al. | |
| 2006/0114133 A1 | 6/2006 | Fujita | |
| 2006/0129665 A1 | 6/2006 | Toebes et al. | |
| 2006/0192994 A1 | 8/2006 | Tanimoto | |
| 2006/0242321 A1 | 10/2006 | Hedge et al. | |
| 2007/0124487 A1 | 5/2007 | Yoshimoto et al. | |
| 2007/0150611 A1 | 6/2007 | Chan et al. | |
| 2007/0160200 A1 | 7/2007 | Ishikawa et al. | |
| 2007/0204341 A1 | 8/2007 | Rand et al. | |
| 2007/0250189 A1* | 10/2007 | Rourke | F24F 11/58 340/3.1 |
| 2007/0294419 A1* | 12/2007 | Ulevitch | H04L 61/4511 709/230 |
| 2008/0016233 A1 | 1/2008 | Schneider | |
| 2008/0027809 A1 | 1/2008 | Storm | |
| 2008/0052758 A1 | 2/2008 | Byrnes | |
| 2008/0071616 A1* | 3/2008 | Hovnanian | G06Q 30/0277 705/14.54 |
| 2008/0178073 A1 | 7/2008 | Gao et al. | |
| 2008/0189774 A1 | 8/2008 | Ansari et al. | |
| 2009/0049164 A1* | 2/2009 | Mizuno | H04L 65/1104 709/223 |
| 2009/0055929 A1 | 2/2009 | Lee et al. | |
| 2009/0113074 A1 | 4/2009 | Statia et al. | |
| 2009/0157889 A1 | 6/2009 | Treuhaft | |
| 2009/0158318 A1 | 6/2009 | Levy et al. | |
| 2009/0182884 A1 | 7/2009 | Datta et al. | |
| 2009/0276803 A1 | 11/2009 | Weaver | |
| 2010/0005146 A1 | 1/2010 | Drako et al. | |
| 2010/0049872 A1 | 2/2010 | Roskind | |
| 2010/0057936 A1 | 3/2010 | Roskind | |
| 2010/0064047 A1 | 3/2010 | Sullivan | |
| 2010/0070608 A1 | 3/2010 | Hosur | |
| 2010/0077462 A1 | 3/2010 | Joffe et al. | |
| 2010/0100957 A1 | 4/2010 | Graham et al. | |
| 2010/0274970 A1 | 10/2010 | Treuhaft et al. | |
| 2011/0078292 A1 | 3/2011 | Ananda et al. | |
| 2011/0099261 A1 | 4/2011 | Joshi | |
| 2011/0153831 A1 | 6/2011 | Mutnuru et al. | |
| 2011/0238192 A1 | 9/2011 | Shah et al. | |
| 2012/0117621 A1 | 5/2012 | Kondamuru et al. | |
| 2012/0147834 A1 | 6/2012 | Zisimopoulos et al. | |
| 2012/0173684 A1 | 7/2012 | Courtney et al. | |
| 2012/0185914 A1 | 7/2012 | Delco et al. | |
| 2012/0191874 A1 | 7/2012 | Robinson et al. | |
| 2012/0206653 A1 | 8/2012 | Graves et al. | |
| 2013/0018944 A1 | 1/2013 | Shyamsunder et al. | |
| 2013/0191537 A1 | 7/2013 | Ivanov et al. | |
| 2013/0198065 A1 | 8/2013 | McPherson et al. | |
| 2013/0227141 A1 | 8/2013 | Schmidt et al. | |
| 2013/0254423 A1 | 9/2013 | George, IV | |
| 2014/0036897 A1 | 2/2014 | Frydman et al. | |
| 2014/0068043 A1 | 3/2014 | Archbold | |
| 2014/0149601 A1 | 5/2014 | Carney et al. | |
| 2014/0207835 A1 | 7/2014 | Jellick et al. | |
| 2014/0215628 A1* | 7/2014 | Yan | H04L 61/4511 726/25 |
| 2014/0280305 A1 | 9/2014 | James et al. | |
| 2014/0280963 A1 | 9/2014 | Burtbridge et al. | |
| 2014/0282847 A1 | 9/2014 | Blacka et al. | |
| 2015/0074221 A1 | 3/2015 | Kuparinen et al. | |
| 2015/0180892 A1 | 6/2015 | Balderas | |
| 2015/0215267 A1 | 7/2015 | Kagan | |
| 2015/0234816 A1 | 8/2015 | Chong et al. | |
| 2015/0281111 A1 | 10/2015 | Carl | |
| 2015/0295882 A1 | 10/2015 | Kaliski, Jr. | |
| 2015/0304199 A1 | 10/2015 | Leask et al. | |
| 2016/0036848 A1 | 2/2016 | Reddy et al. | |
| 2016/0065675 A1 | 3/2016 | Brand | |
| 2016/0072847 A1 | 3/2016 | Bremen et al. | |
| 2016/0127305 A1 | 5/2016 | Droms et al. | |
| 2016/0315969 A1 | 10/2016 | Goldstein | |
| 2017/0005914 A1 | 1/2017 | Edge et al. | |
| 2018/0041466 A9 | 2/2018 | Kagan | |
| 2018/0063162 A1 | 3/2018 | Baughman et al. | |

FOREIGN PATENT DOCUMENTS

| | | |
|---|---|---|
| JP | 2005-86700 A | 3/2005 |
| KR | 10-2007-0113600 A | 11/2007 |
| WO | 00/14938 A2 | 3/2000 |

(56) References Cited

FOREIGN PATENT DOCUMENTS

| WO | 00/14939 A1 | 3/2000 |
|---|---|---|
| WO | 2006/114133 A1 | 11/2006 |
| WO | 2009/005433 A1 | 1/2009 |
| WO | 2017/083759 A1 | 5/2017 |

OTHER PUBLICATIONS

Savolainen et al., "Improved Recursive DNS Server Selection for Multi-Interfaced Nodes", RFC 6731, Internet Engineering Task Force, IETF; Standard, Internet Society (ISOC) 4, Geneva, Switzerland, Dec. 19, 2012, 29 pages.

Damas et al., "Extension Mechanisms for DNS (EDNS(0))", RFC 6891, Internet Engineering Task Force, IETF; Standard, Internet Society (ISOC) 4, Geneva, Switzerland, Apr. 17, 2013, 16 pages.

Sevilla et al., "iDNS: Enabling Information Centric Networking Through the DNS", 2014 IEEE Conference on Computer Communications Workshops (Infocom Wkshps), IEEE, Apr. 27, 2014, pp. 476-481.

Nagele, Wolfgang, "Analysis of Increased Query Load on Root Name Servers—RIPE Labs", Retrieved from the Internet, URL: https://labs.ripe.net/Members/wnagele/analysis-of-increased-query-load-on-root-name-servers [retrieved on May 18, 2016], Jul. 11, 2011, 7 pages.

Anonymous: "ICANN: ccTLD Constituency Draft Contract for Services: Nov. 14, 2000", Retrieved from the Internet: URL: https://archive.icann.org/en/cctlds/cctldconst-8th-draft-contract-14nov00.htm [retrieved on May 18, 2016], Nov. 14, 2000, 4 pages.

Edmonds, R., "Signaling DNS Capabilities draft-edmonds-dnsop-capabilities-00", https://datatracker.ietf.org/doc/draft-edmonds-dnsop-capabilities/, Jul. 2, 2017, 7 pages.

"https://www.iana.org/assignments/dns-parameters/dns-parameters.xhtml#dns-parameters-1", Aug. 30, 2017, 11 pages.

Herzberg et al., "Negotiating DNSSEC Algorithms Over Legacy Proxies", International Conference on Cryptology and Network Security, Springer, DOI:10.1007/978-3-319-12280-9_8, Oct. 2014, pp. 1-16.

Herzberg et al., "Less is more: Cipher-Suite Negotiation for DNSSEC" Proceedings of the 30th Annual Computer Security Applications Conference. ACM, http://dx.doi.org/10.1145/2664243.2664283, Dec. 8-12, 2014, 10 pages.

Herzberg et al., "Cipher-Suite Negotiation for DNSSEC: Hop-by-Hop or End-to-End?", IEEE Internet Computing, vol. 19, No. 1, https://www.researchgate.net/profile/Amir_Herzberg/publication/272385849 Cipher -suite_ negotiationfor_ DNSSEC Hop-by-hop_ or_ end-to-end/inks/54ee39730cf2e283086459ec.pdf, 2015, pp. 80-84.

Huque et al., "Algorithm Negotiation in DNSSEC," draft-huque-dnssec-alg-nego-00, https://datatracker.ietf.org/doc/draft-huque-dnssec-alg-nego/, Jul. 20, 2017, 7 pages.

Shaikh et al., "On the Effectiveness of DNS-based Server Selection", Proceedings IEEE Infocom 2001, vol. 3, DOI: 10.1109/INFCOM.2001.916678, Apr. 22-26, 2001, pp. 1801-1810.

Shimokawa et al., "Flexible Server Selection in Widely Distributed Environments", Research Reports on Information Science and Electrical Engineering, vol. 5, No. 1, Mar. 2000, pp. 7-12.

Daley, G., "Use of DNS SRV records for host selection draft-daley-dnsext-host-srv-00.txt", Dec. 31, 2009, 13 pages.

Trusted Automated Exchange of Indicater Information, http://taxii.mitre.org/, retrieve on Nov. 24, 2020, 2 pages.

Managed Incident Lightweight Exchange (mile) http://datatracker.ietf.org/wg/mile/documents/, retrieved on Nov. 24, 2020, 2 pages.

Weimer, Florian, "Passive DNS Replication", Presented at FIRST 2005, http://www.enyo.de/fw/software/dnslogger/first2005-paper.pdf, Apr. 2005, pp. 1-13.

Vixie, Paul, "Passive DNS and ISC SIE", Presented at DNS-OARC Workshop, https://indico.dns-oarc.net/contributionDisplay.py?contribId=48&confid=8, Nov. 2-3, 2007, 10 pages.

Verisign Labs, "New gTLD Security and Stability Considerations", https://www.verisigninc.com/assets/gtld-ssr-v2.1-final.pdf, Mar. 2013, pp. 1-10.

Verisign Labs, "New gTLD Security, Stability, Resiliency Update: Exploratory Consumer Impact Analysis", http://techreports.verisignlabs.com/ docs/tr-1140008-1.pdf, Aug. 22, 2013, pp. 1-28.

DNS-OARC, "Domain Name System Operations Analysis and Research Center", https://www.dnsoarc.net/, Accessed Dec. 16, 2014, 3 pages.

Osterweil et al., "Opportunistic Encryption with DANE Semantics and IPsec: IPSECA", Internet-Draft draft-osterweil-dane-ipsec-01, https://datatracker.ietf.org/doc/draft-osterweil-dane-ipsec/, Aug. 28, 2014, pp. 1-19.

Hu et al., "Starting TLS over DNS", Internet-Draft draft-hzhwm-start-tls-for-dns-01, https://datatracker.ietf.org/doc/draft-hzhwm-start-tlsfor-dns/, Jul. 4, 2014, pp. 1-12.

Bortzmeyer, S. "DNS Query Name Minimisation to Improve Privacy", Internet-Draft draft-ietfdnsop-qname-minimisation-00, https://datatracker.ietf.org/doc/draft-ietf-dnsopqname-minimisation/, Oct. 22, 2014, pp. 1-7.

Public Suffix List, https://publicsuffix.org/, Accessed Dec. 16, 2014, 1 page.

Elz at al., "Clarifications to the DNS Specification", RFC 2181, http://tools.ietf.org/html/rfc2181, Jul. 1997, pp. 1-15.

Kumari et al., "Decreasing Access Time to Root Servers by Running One on Loopback", Internet-Draft draft-wkumari-dnsop-root-loopback-00, http://tools.ietf.org/html/draft-wkumari-dnsop-root-loopback-00, Oct. 25, 2014, pp. 1-5.

Lee et al., "How to Scale the DNS Root System?", Internet-Draft draft-lee-dnsop-scalingroot-00.txt, http://tools.ietf.org/html/draft-lee-dnsopscalingroot-00, Jul. 3, 2014, pp. 1-11.

Arends et al., "Resource Records for the DNS Security Extensions", RFC 4034, https://datatracker.ietf.org/doc/rfc4034/, Mar. 2005, pp. 1-29.

ICANN Root Server System Advisory Committee (RSSAC), "RSSAC-001: Service Expectation of Root Servers", https://www.icann.org/en/system/files/files/rssac-001-draft-02may13-en.pdf, May 2, 2013, pp. 1-10.

ICANN Root Server System Advisory Committee (RSSAC), "RSSAC-002: RSSAC Advisory on Measurements of the Root Server System", https://www.icann.org/en/system/files/files/rssac-002-measurements-root-20nov14-en.pdf, Nov. 20, 2014, 15 pages.

ICANN, "Identifier Technology Innovation Panel—Draft Report", http://www.icann.org/en/about/planning/strategic-engagement/identifier-technology/report-21feb14-en.pdf, Feb. 21, 2014, pp. 1-52.

VeriSign, Inc., "Comments on Identifier Technology Innovation Panel Draft Report", http://mm.icann.org/pipermail/itipanel/attachments/20140430/361e539a/verisign-commentsiti-panel-2014-04-30-0001.pdf, Apr. 30, 2014.

Information-Centric Networking Research Group (ICNRG), https://irtf.org/icnrg, Accessed Dec. 16, 2014, 4 pages.

About getdns, http://getdnsapi.net/, Accessed Dec. 10, 2014, pp. 1-6.

Extended European Search Report for application No. 15200405.7 dated May 30, 2016.

Extended European Search Report for application No. 19173127.2 dated Oct. 7, 2019.

Non-Final Office Action dated Oct. 30, 2015, U.S. Appl. No. 14/252,483, pp. 1-39.

Eastlake, Donald, "Domain Name System Security Extensions; draft-ietf-dnssec-secext2-07.txt," Dec. 1, 1998, vol. dnssec, No. 7, Dec. 1, 1998, 98 pages.

European Search Report dated Jan. 25, 2013, European Application No. EP 12 18 7127, filed Oct. 3, 2012, pp. 1-5.

Extended European Search Report dated Jun. 26, 2014, European Application No. 14159613.0 filed Mar. 13, 2014, pp. 1-8.

Non-Final Office Action dated Aug. 26, 2014, U.S. Appl. No. 13/836,682, filed Mar. 15, 2013, pp. 1-39.

Ingemar Cox et al., "The First 50 Years of Electronic Watermarking", EURASIP Journal on Applied Signal Processing, 2002, pp. 126-132.

Non-Final Office Action dated Sep. 3, 2013, U.S. Appl. No. 13/836,682, filed Mar. 15, 2013, pp. 1-44.

(56) References Cited

OTHER PUBLICATIONS

Jeff Tyson, "How Encryption Works", Dec. 6, 2005, howstuffworks.com, retrieved from Wayback Machine.
H. Kaplan et al., "DNS Extension for ENUM Source-URI", IETF Internet Draft, Dec. 11, 2007, http://tools.ietf.org/html/draft-kaplan-enum-source-uri-00, Retrieved from the internet on May 29, 2014, pp. 1-8.
Basu et al., "Persistent Delivery With Deferred Binding to Descriptively Named Destinations", MILCOM 2008—2008 IEEE Military Communications Conference, 8 pp.
O. Kolkman et al., "Architectural Considerations on Application Features in the DNS", IETF Internet Draft, Mar. 14, 2011, http://tools.ietf.org/html/draft-iab-dns-applications-01, Retrieved from the internet on May 29, 2014, pp. 1-24.
Extended European Search Report dated Aug. 27, 2015, European Application No. 15163265.0, pp. 1-4.
Chandramouli et al., "Challenges in Securing the Domain Name System," www.computer.org/security/, The IEEE Computer Society, Jan./Feb. 2006, pp. 84-87.
But et al., "Evaluting the Impact of DNS and HTTP Session Characteristics on Consumer ISP Web Traffic," TenCon2005, http://caia.swin.edu.au, Nov. 2005.
Final Office Action dated Feb. 26, 2016, U.S. Appl. No. 14/252,483, pp. 1-17.
Non-Final Office Action dated Aug. 12, 2016, U.S. Appl. No. 14/252,483, pp. 1-19.
Non-Final Office Action dated May 26, 2017, U.S. Appl. No. 14/252,483, pp. 1-24.
Communication Pursuant to Article 94(3) EPC dated Sep. 15, 2017, European Application No. 12187127.1, pp. 1-5.
First Chinese Office Action dated Feb. 23, 2018, Chinese Application No. 201410148379.0, pp. 1-27 (Including English Translation).
C. Contavalli et al., "Client IP Information in DNS Requests", IETF Internet Draft, May 21, 2010, http://tools.ietf.org/html/draft-vandergaast-edns-client-ip-01, Retrieved from the internet on May 29, 2014, pp. 1-23.
Teddy Mantoro, Saiful Azhar Norhanipah, Ahmad Fakhrurrazi Bidin, An Implementation on Domain Name System Security Extensions Framework for the Support of 1Pv6 Environment, 2011 International Conference on Multimedia Computing and Systems (ICMCS), Apr. 7-9, 2011, pp. 1-6, IEEE DOI: 10.11 09/ICMCS.2011.5945627.
Kiril Lascchiver, "Domain Name System Anomaly Detection and Prevention," Sep. 2010, Thesis of School of Engineering and Computer Science, The Hebrew University of Jerusalem; Jerusalem, Israel.
International Search Report issued in Interational Application No. PCT/US2016/061679, dated Feb. 28, 2017.
Written Opinion issued in Interational Application No. PCT/US2016/061679, dated Feb. 28, 2017.
International Preliminary Report on Patentability issued in International Patent Application No. PCT/US2016/061679, dated May 15, 2018.
Anonymous: "Set DNS," Oct. 3, 2015, pp. 1-3, retrieved from the internet: http://web.archive.org/web/20151003145236/https://play.google.com/store/apps/details?d=uk.co.mytechnie.setDNS&hl=en [retrieved on Feb. 20, 2017].
David Ulevitch: "Introducing FamilyShield Parental Controls—OpenDNS Umbrella Blog," Jun. 23, 2010, pp. 1-3, https://blog.opendns.com/2010/06/23/introducing-familyshield-parental-controls/.
Jack Busch: "How to Set Up OpenDNS on Your Home Network [Router Configuration]", Feb. 25, 2013, pp. 1-10, retrieved from the internet: https://www.groovypost.com/howto/setup-opendns-home-network-router/.
Peterson et al., "Architectural Considerations on Application Features in the DNS," RFC 6950, Oct. 2013, 31 pages.

* cited by examiner

TECHNIQUES FOR DIRECTING A DOMAIN NAME SERVICE (DNS) RESOLUTION PROCESS

CROSS-REFERENCE TO RELATED APPLICATIONS

This application is a continuation of U.S. patent application titled, "TECHNIQUES FOR DIRECTING A DOMAIN NAME SERVICE (DNS) RESOLUTION PROCESS", filed Sep. 22, 2020 and having Ser. No. 17/028,616, which is a continuation of U.S. patent application titled, "TECHNIQUES FOR DIRECTING A DOMAIN NAME SERVICE (DNS) RESOLUTION PROCESS", filed Nov. 10, 2016 and having Ser. No. 15,348,905, which claims the priority benefit of the U.S. provisional patent application titled, "NAME SERVER DESIGNATION BASED ON SECURITY SETTING" having Ser. No. 62/254,308 filed on Nov. 12, 2015. The subject matter of these related applications is hereby incorporated herein by reference.

BACKGROUND OF THE INVENTION

Field of the Invention

Embodiments of the present invention relate generally to computer networks and, more specifically, to techniques for directing a domain name service (DNS) resolution process.

Description of the Related Art

As is well-known, the domain name service (DNS) is the part of the Internet infrastructure that translates human-readable domain names into the Internet Protocol (IP) addresses needed to establish TCP/IP (Transmission Control Protocol/Internet Protocol) communication over the Internet. The DNS is the mechanism that allows users to refer to web sites and other Internet resources via intuitive domain names, such as "example.com," rather than the actual numeric IP addresses, e.g., 192.0.2.78, that are associated with different websites and other Internet resources. As referred to herein, an "Internet resource" may be any type of device or service that is accessible via the Internet.

Each domain name is typically made up of a series of character strings or "labels," where every two such character strings within the domain name are separated by a period. The right-to-left order of the labels within a domain name corresponds to a top-to-bottom order of domain names in a DNS hierarchy. To translate a particular domain name to a corresponding IP address, a DNS server, known as a "recursive resolver," traverses the DNS hierarchy in a process referred to herein as a "DNS resolution process."

To enable a user device to instigate the DNS resolution process, when the user device connects to an underlying network, the underlying network provides DNS settings that specify the recursive resolver for the DNS resolution process. However, the efficiency of the DNS resolution process, the operations performed during the DNS resolution process, and the resulting DNS responses may vary based on the specified recursive resolver. In particular, different recursive resolvers may implement different security functionality. For example, one recursive resolver could implement malware filtering and, consequently, would block access to a "malware" website. By contrast, another recursive resolver could lack malware filtering and, consequently, would allow access to the malware website. Further, the providers of different recursive resolvers may implement different privacy policies. For example, the provider of one recursive resolver could sell the contents of DNS queries to multiple external companies, while the provider of another recursive resolver could treat DNS queries as confidential.

To enable a user to direct the DNS resolution process to reflect user preferences, such as preferences regarding performance, privacy, security, and the like, some user devices implement "DNS controls." In general, DNS controls allow a user to override the DNS settings provided by certain underlying networks with DNS settings that specify the recursive resolver for the DNS process as a preferred recursive resolver. DNS controls typically enable a user to override the DNS settings provided by enterprise networks, Internet Service Provider (ISP) networks, and Wi-Fi networks. However, DNS controls are unable to override the DNS settings provided by mobile operator networks, such as a Verizon network and a Sprint network. Accordingly, while a user device is connected to a mobile operator network, the DNS resolution process is performed by the recursive resolver selected by the mobile operator instead of the recursive resolver selected by the user.

As the foregoing illustrates, what is needed in the art are more effective techniques for specifying the recursive resolver for the domain name service resolution process.

SUMMARY OF THE INVENTION

One embodiment of the present invention sets forth a method for specifying a recursive resolver for a domain name service (DNS) resolution process. The method includes receiving a first set of DNS settings that is associated with an underlying mobile operator network to which a user device is connected, where the first set of DNS settings specifies a first recursive resolver to be implemented as a recursive resolver for a DNS resolution process; and causing the user device to disregard the first set of DNS settings and implement a second set of DNS settings that is associated with an activated privacy and security mode, where the second set of DNS settings specifies a second recursive resolver to be implemented as the recursive resolver for the DNS resolution process.

Further embodiments provide, among other things, a computer-readable medium and a system configured to implement the method set forth above.

BRIEF DESCRIPTION OF THE DRAWINGS

One advantage of the disclosed techniques is that a user may specify a preferred recursive resolver irrespective of the underlying network to which the user device is connected. The preferred recursive resolver may reflect user preferences, such as preferences regarding performance, privacy, security, and the like. By contrast, conventional DNS controls for specifying a preferred recursive resolver are unable to override the DNS settings provided by mobile operator networks.

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
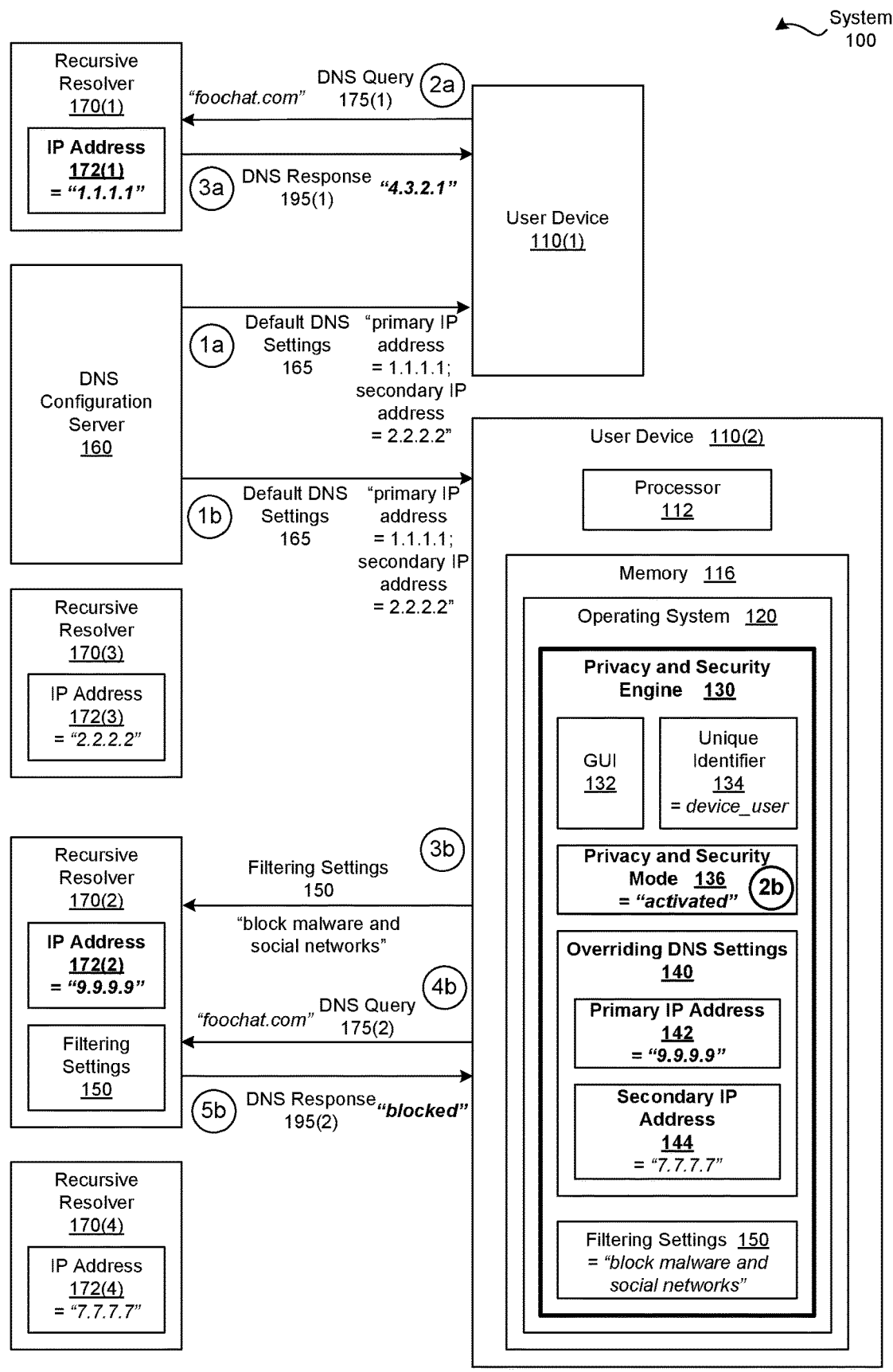
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, user devices 110, recursive resolvers 170, and a domain name system (DNS) configuration server 160. In alternate embodiments, the system 100 may include any number of user devices 110, any number of recursive resolvers 170, and any number of DNS configuration servers 160, in any combination. For explanatory purposes, multiple instances of like objects are denoted with reference numbers identifying the object and parenthetical numbers identifying the instance where needed.

Each of the user devices 110 may be any type of device that is capable of communicating with other devices. For example, the user devices 110 could include conventional computing devices, smart phones, wearable technology devices, appliances (e.g. washer/dryers that utilize network communications, smart thermostat systems, etc.), sensors (e.g. remote monitoring heart monitoring implants, biochip transponders, automobiles sensors, etc.), traffic lights, parking meters, and the like.

As shown for the user device 110(2), the user devices 110 include, without limitation, a processor 112 and a memory 116. The processor 112 may be any instruction execution system, apparatus, or device capable of executing instructions. For example, the processor 112 could comprise a central processing unit (CPU), a digital signal processor (DSP), a controller, a microcontroller, a state machine, or any combination thereof.

The memory 116 stores content, such as software applications and data, for use by the associated processor 112. The memory 116 may be any type of non-volatile memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

As shown, the memory 116 includes, without limitation, an operating system (OS) 120. The OS 120 is a software application that supports fundamental functions of the user device 110. Examples of fundamental functions include scheduling tasks, executing other software applications, managing hardware and software resources including the memory 116, controlling peripheral devices (e.g., printers), and so forth. The OS 120 is capable of executing in highly privileged modes that enable the OS 120 to perform actions that other software applications are typically unable to perform. For example, oftentimes the OS 120 is capable of modifying system files that other software applications are not authorized to modify.

In alternate embodiments, each of the user devices 110, the recursive resolvers 170, and the DNS configuration server 160 may include any number (including zero) and types of processors 112 and any number (including zero) and types of memories 116 in any combination. The processor 112 and the memory 116 may be implemented in any technically feasible fashion. For example, and without limitation, in various embodiments, the processor 112 and/or the memory 116 may be implemented as a stand-alone chip or as part of a more comprehensive solution that is implemented as an application-specific integrated circuit (ASIC) or a system-on-a-chip (SoC). In some embodiments, the user devices 110, the recursive resolvers 170, and the DNS configuration server 160 may interact with one or more clouds (e.g., encapsulated shared resources, software, data, etc.) to perform operations associated with the system 100. In such embodiments, the processor 112 and/or the memory 116 may be implemented in the cloud instead of in the user devices 110, the recursive resolvers 170, and the DNS configuration server 160.

As a general matter, the system 100 includes, without limitation, entities and software that provide underlying technologies to support essential Internet functions, such as communications and security. In particular, the recursive resolvers 170 provide a portion of a framework that implements the domain name system (DNS) protocol. For explanatory purposes, entities that provide the framework that implements the DNS protocol, including the recursive resolvers 170, are referred to herein as "DNS servers." In alternate embodiments, the system 100 may include any number and types of other DNS servers in addition to the recursive resolvers 170. For example, in various embodiments, the system 100 may include authoritative name servers and forwarding resolvers.

The DNS is the part of the Internet infrastructure that translates human-readable domain names into the Internet Protocol (IP) addresses 172 needed to establish TCP/IP (Transmission Control Protocol/Internet Protocol) communication over the Internet. The DNS is the mechanism that allows users to refer to web sites and other Internet resources via intuitive domain names, such as "example.com," rather than the actual IP addresses 172, e.g., 192.0.2.78, that are associated with different websites and other Internet resources. As referred to herein, an "Internet resource" may be any type of device or service that is accessible via the Internet.

Each domain name is typically made up of a series of character strings or "labels," where every two such character strings within the domain name are separated by a period. The right-to-left order of the labels within a domain name correspond to the top-to-bottom order of domain names in a DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "example.com". Domains can nest within the hierarchy for many levels. To translate a given domain name to a corresponding IP address, the recursive resolver 170 traverses the DNS hierarchy. The process of traversing the DNS hierarchy is referred to herein as a "DNS resolution process."

In general, the DNS enables users to associate a variety of information with domain names based on resource records. For example, in addition to storing address records that map domain names to the corresponding IP addresses 172, the DNS stores service records (SRV) that identify services. Further, the DNS stores text records (TXT) that include arbitrary text and enable the DNS to serve as a general purpose database. A hierarchy of the DNS servers included in the system 100 maintain the resource records in large databases.

In operation, to enable the user device 110 to access information that is associated with a domain name, when the user device 110 connects to an underlying network, a DNS configuration server 160 that is associated with the underlying network provides default DNS settings 165. The underlying network comprises any number and type of physical links (e.g., wireless, wired, etc.) that connect the user device 110 to the Internet. Examples of underlying networks include mobile operator networks (e.g., Verizon) enterprise networks, Internet Service Provider (ISP) networks, Wi-Fi networks, and the like.

The DNS configuration server 160 may be any server that provides configuration information for the underlying network. For instance, in some embodiments, the DNS configuration server 160 comprises a Dynamic Host Configuration Protocol (DHCP) server. In addition to providing the default DNS settings 165, the DHCP server manages a pool of the IP addresses 172 and assigns the IP addresses 172 to entities (including the user devices 110) on the underlying network on-demand.

The default DNS settings 165 include, without limitation, the IP addresses 172 of both a "primary" recursive resolver 170(1) and a "secondary" recursive resolver 170(3). In a "default DNS resolution process," the default DNS settings 165 specify the recursive resolver 170 that executes the DNS resolution process for the user device 110. The recursive resolver 170 that executes the DNS resolution process is referred to herein as "the recursive resolver 170 for the DNS resolution process."

To access information that is associated with a domain name, the user device 110 generates a DNS query 175 that specifies the domain name. The user device 110 then attempts to transmit the DNS query 175 to the primary recursive resolver 170(1) specified in the default DNS settings 195. In response to the DNS query 175, the primary recursive resolver 170(1) executes the DNS resolution process to generate a DNS response 195 to the DNS query 175. If the primary recursive resolver 170(1) is unavailable (e.g., due to a power outage), then the user device 110 transmits the DNS query 175 to the secondary recursive resolver 170(3) specified in the default DNS settings 195. In response to the DNS query 175, the secondary recursive resolver 170(3) executes the DNS resolution process to generate the DNS response 195 to the DNS query 175.

The user device 110 may generate and transmit the DNS query 175 to the recursive resolver 170 in any technically feasible fashion. In some embodiments, the OS 120 may generate and transmit the DNS query 175 to the recursive resolver 170. In alternate embodiments, the user device 110 may include a stub resolver that generates and transmits the DNS query 175 to the recursive resolver 170. The user device 110 may generate and transmit the DNS query 175 to the recursive resolver 170 in response to any type of event. For example, suppose that a user visits a website "example.com" via a web browser executing on the user device 110.

Further, suppose that a cache associated with the OS 120 executing on the user device 110 does not include a suitable translation for "example.com" to the corresponding IP address 172. In such a scenario, the OS 120 could generate and transmit the DNS query 175 (requesting the IP address 172 associated with "example.com") to the recursive resolver 170.

For explanatory purposes only, FIG. 1 depicts a sequence of events involved in a default DNS resolution process using a series of bubbles labeled 1a, 2a, and 3a. First, as depicted with the bubble labeled 1a, the user device 110(1) receives the default DNS settings 165 from the DNS configuration server 160. As shown, the default DNS settings 165 includes the primary IP address 172 of "1.1.1.1" associated with the recursive resolver 170(1). As depicted with the bubble labeled 2a, the user device 110(2) then transmits the DNS query 175(1) to the recursive resolver 170(1). The DNS query 175(1) requests the IP address 172 of the website "foochat.com." In response, as depicted with the bubble labeled 3a, the recursive resolver 170(1) transmits the DNS response 195(1) to the user device 110(1). The DNS response 195(1) specifies the IP address 172 "4.3.2.1."

As persons skilled in the art will recognize, the efficiency of the DNS resolution process, the operations performed during the DNS resolution process, and the resulting DNS responses 175 may vary based on the recursive resolver 170. For instance, oftentimes different recursive resolvers 170 implement different privacy and security functionality. Notably, the recursive resolver 170(1) that generates the DNS response 195(1) as part of the default DNS resolution process does not implement any privacy or security functionality. By contrast, the recursive resolver 170(2) implements a variety of techniques to preserve the privacy of the DNS queries 175 and enforce filter settings 150. The filtering settings 150 are typically configurable settings that specify whether an access to a particular website, types of website, particular information, or types of information is authorized.

To enable a user to direct the DNS resolution process to reflect user preferences, such as preferences regarding performance, privacy, security, and the like, some user devices 110 implement "DNS controls." In general, DNS controls allow a user to override the default DNS settings 165 provided by certain underlying networks with DNS settings that specify that a "preferred" recursive resolver 175 that is to be implemented as the recursive resolver 170 for the DNS process. The "preferred" recursive resolver 170 reflects the user preferences.

Conventional DNS controls typically enable a user to override the default DNS settings 165 provided by enterprise networks, Internet Service Provider (ISP) networks, and Wi-Fi networks. However, conventional DNS controls are unable to override the default DNS settings 165 provided by mobile operator networks, such as a Verizon network and a Sprint network. Accordingly, while a user device 110 is connected to a mobile operator network, the DNS resolution process is performed by the recursive resolver 170 selected by the mobile operator instead of the recursive resolver 170 selected by the user.

Enabling Comprehensive User Directed DNS Resolution

To enable the user to direct the DNS resolution process to reflect user preferences in a more comprehensive fashion, the OS 120 includes, without limitation, a privacy and security engine 130. The privacy and security engine 130 comprises a software program that generally resides with the memory 116 and is executed by the processor 112 associated with the user device 110. As persons skilled in the art will recognize, because the privacy and security engine 130 is part of the OS 120, the privacy and security engine 130 may perform operations (e.g., access system files, etc) that conventional DNS controls are unable to implement. In particular, the privacy and security engine 130 is capable of overriding the default DNS settings 165 provided by any underlying network, including a mobile operator network.

The privacy and security engine 130 may cause the user device 110 to override the default DNS settings 165 in any technically feasible fashion. For instance, in some embodiments, the privacy and security engine 130 may cause the user device 110 to disregard the default DNS settings 165 and implement overriding DNS settings 140 that are associated with a privacy and security mode 136. More specifically, in some embodiments the privacy and security engine 130 may overwrite the IP address 172 that is stored in a protected memory location that identifies the primary recursive resolver 170. In addition, the privacy and security engine 130 may overwrite the IP address 172 that is stored in a protected memory location that identifies the secondary recursive resolver 170.

In alternate embodiments, the privacy and security engine 130 may be implemented in any technically feasible fashion that enables the privacy and security engine 130 to override the default DNS settings 165 irrespective of the underlying network that provides the default DNS settings 165. In various embodiments, the functionality of the privacy and security engine 130 is integrated into or distributed across any number (including one) of software applications. For instance, in various embodiments, the privacy and security engine 130 may be implemented as a software application that is not included in the OS 120 and may or may not interact with the OS 120. In other embodiments, a portion or all of the functionality of the privacy and security engine 130 may be integrated into a stub resolver.

The privacy and security engine 130 described herein is not limited to any particular system 100 and may be adapted to take advantage of new systems 100 as they become available. In alternate embodiments, the functionality of the privacy and security engine 130 may be implemented and provided in any technically feasible. For instance, in some embodiments the privacy and security engine 130 may be provided as an application program (or programs) stored on computer readable media such as a CD-ROM, DVD-ROM, flash memory module, or other tangible storage media.

As shown, the privacy and security engine 130 includes, without limitation, a graphical user interface (GUI) 132, a unique identifier 134, the privacy and security mode 136, the overriding DNS settings 140 and the filtering settings 150. In operation, the privacy and security engine 130 displays the GUI 132 as part of a system-level GUI (not shown in FIG. 1) that is provided by the user device 110. In general, the GUI 132 enables the user to specify user preferences that are associated with selecting and/or configuring the recursive resolver 170 for the DNS resolution process. In alternate embodiments, the GUI 132 may be replaced with any user interface that enables the user to specify any number and type of user preferences that are associated with the DNS resolution process.

The unique identifier 134 may be any type of identifier that is based on the device 110, the user, and/or any number of other distinguishing characteristics that may be associated with DNS queries 175, in any combination. The unique identifier 134 may be associated with the DNS queries 175 in any technically feasible fashion and at any level of granularity. In some embodiments, the unique identifier 134 comprises the IP address 172 associated with the user device 110. In other embodiments, the unique identifier 134 is based on both the IP address 172 associated with the user device 110 and a user identification. For example, the unique identifier 134 could be a combination of the IP address 172 associated with the user device 110 and a user name.

In yet other embodiments, the unique identifier 134 may identify an organization within a company. Accordingly, the unique identifier 134 for a given user device 110 may match the unique identifier 134 for other user devices 110. In various embodiments, the device 110 may include multiple instances of the privacy and security engine 130, and different instances may include different unique identifiers 134, different privacy and security modes 136, different overriding DNS settings 140, and/or different filtering settings 150.

The privacy and security mode 136 may be either "deactivated" or "activated." If the privacy and security mode 136 is deactivated, then the privacy and security engine 130 does not alter the default DNS resolution process. More precisely, the privacy and security engine 130 does not override the default DNS settings 165 provided by the underlying network. By contrast, if the privacy and security mode 136 is "activated," then the privacy and security engine 130 overrides the default DNS settings 165 with the overriding DNS settings 140.

As shown, the overriding DNS settings 140 include, without limitation, a primary IP address 142 and a secondary IP address 144. The primary IP address 142 specifies the IP address 172 associated with a user-selected primary recursive resolver 170 and the secondary IP address 142 specifies the IP address 172 associated with a user-selected secondary recursive resolver 170. In general, the user sets the overriding DNS settings 140 via the GUI 132 to specify a pair of recursive resolvers 170 that comply with the user preferences.

If the privacy and security mode 136 is activated, then to obtain information that is associated with a domain name, the user device 110 implements a "user directed DNS resolution process" instead of the default DNS resolution process. In the user directed DNS resolution process, the user device 110 generates the DNS query 175 that specifies the domain name. The user device 110 then attempts to transmit the DNS query 175 to the user-selected primary recursive resolver 170(2) specified by the primary IP address 142 included in the overriding DNS settings 140. In response to the DNS query 175, the user-selected primary recursive resolver 170(2) executes the DNS resolution process to generate a DNS response 195 to the DNS query 175.

If the user-selected primary recursive resolver 170(2) is unavailable (e.g., due to a power outage), then the user device 110 transmits the DNS query 175 to the user-selected secondary recursive resolver 170(4) specified by the secondary IP address 144 included in the overriding DNS settings 140. In response to the DNS query 175, the user-selected secondary recursive resolver 170(4) executes the DNS resolution process to generate the DNS response 195 to the DNS query 175.

In some embodiments, the privacy and security engine 130 implements a list of predetermined DNS settings. As part of prompting the user to specify the overriding DNS settings 140, the GUI 132 displays the list of predetermined DNS settings. The user may set the overriding DNS settings 140 equal to one of the predetermined DNS settings or explicitly enter the primary IP address 142 and the secondary IP address 144 included in the overriding DNS settings

140. In general, the privacy and security engine 130 and the GUI 132 may implement the predetermined DNS settings in any technically feasible fashion.

One of the predetermined DNS settings 140 is the default DNS setting 165. If the user sets the overriding DNS settings 140 equal to the default DNS setting 165, then the privacy and security engine 130 deactivates the privacy and security mode 136. Further, because the privacy and security engine 130 may have previously disregarded the default DNS setting 165 provided by the underlying network, the privacy and security engine 130 transmits a network poll to the DNS configuration server 160 to request the default DNS settings 165. The privacy and security engine 130 then selects the recursive resolver 170 for the DNS resolution process based on the default DNS settings 165. In alternate embodiments, the privacy and security engine 130 may obtain the default DNS settings 165 in response to any type of event and in any technically feasible fashion.

The filtering settings 150 may include any number and type of configurable settings that are compatible with the recursive resolvers 170 specified in the overriding DNS settings 140. In operation, after the user selects the overriding DNS settings 140 via the GUI 132, the privacy and security engine 130 attempts to ascertain the capabilities of the recursive resolvers 170 specified in the overriding DNS settings 140. The privacy and security engine 130 may attempt to ascertain the capabilities of the recursive resolvers 170 in any technically feasible fashion.

For instance, for each of the predetermined DNS settings, the privacy and security engine 130 includes the filtering settings 150 that are supported by the corresponding recursive resolvers 170. If the user selects one of the predetermined DNS settings as the overriding DNS settings 140, then the privacy and security engine 130 configures the GUI 132 to display widgets (e.g., menus, radio buttons, etc.) that enable the user to select values for the supported filtering settings 150. The privacy and security engine 130 and the GUI 132 may implement the predetermined DNS settings 140 and store the associated filtering settings 150 in any technically feasible fashion.

The filtering settings 150 may include any number and type of settings that customize the DNS resolution operations performed by the recursive resolver 170. For example, the filtering settings 150 could include parental controls that enable a parent to block websites that are associated with malware, specified categories (e.g., gambling, social networks, videos, etc.), or a blacklist. In another example, the filtering settings 150 could include controls that configure the recursive resolver 170 to block access to all Internet resources that are not specified in a whitelist.

After the user selects the filtering settings 150 via the GUI 132, the privacy and security engine 130 causes the recursive resolvers 170 specified by the overriding DNS settings 140 to implement the filtering settings 150. The privacy and security engine 130 may perform any number of configuration operations in any technically feasible fashion. For example, the privacy and security engine 130 could transmit the filtering settings 150 and the unique identifier 134 to the recursive resolver 150 to configure the recursive resolver 170 to apply the filtering settings 150 when processing DNS queries 175 that are associated with the unique identifier 134. In alternate embodiments, the privacy and security engine 130 may transmit any amount of information instead of or in addition to the unique identifier 134 to configure the recursive resolver 170 to apply the filtering settings 150.

In some embodiments, as part of enforcing the filtering settings 150, the privacy and security engine 130 may cause the user device 110 to transmit identifying information to the recursive resolver 150 in conjunction with the DNS queries 175. For example, in some embodiments, the privacy and security engine 130 may cause the user device 110 to attach the unique identifier 134 to DNS queries 175 in a manner that complies with a protocol that is implemented in the recursive resolver 170. In other embodiments, the recursive resolver 170 may obtain and/or derive the unique identifier 134 in any technically feasible fashion without receiving any additional information from the user device 110, the OS 120, or the privacy and security engine 130.

Advantageously, the privacy and security engine 130 maintains the user preferences specified via the GUI 132 irrespective of the underlying network. For example, suppose that the privacy and security mode 136 for a given user device 110 is activated when the user device 110 is connected to an ISP network. The privacy and security engine 130 ensures that the user device 110 transmits the DNS queries 175 to the recursive resolver 170 that is specified by the overriding DNS settings 140. Subsequently, suppose that user device 110 disconnects from the ISP network and connects to a mobile operator network. The DNS configuration server 160 associated with the mobile operator network transmits new default DNS settings 165 to the user device 110. However, the privacy and security engine 130 ensures that the user device 110 disregards the default DNS settings 165 and continues to transmits the DNS queries 175 to the recursive resolver 170 that is specified by the overriding DNS settings 140.

For explanatory purposes only, FIG. 1 depicts a sequence of events involved in a user directed DNS resolution process using a series of bubbles labeled 1*b*-5*b*. Although not shown in FIG. 1, the privacy and security mode 136 associated with the user device 110(2) is initially deactivated. First, as depicted with the bubble labeled 1*b*, the user device 110(2) receives the default DNS settings 165 from the DNS configuration server 160. As shown, the default DNS settings 165 includes the primary IP address 172 "1.1.1.1" that is associated with the recursive resolver 170(1). Since the privacy and security mode 136 is deactivated, the privacy and security engine 130 sets the recursive resolver 170 for the DNS resolution process equal to the recursive resolver 170(1).

Subsequently, as depicted with the bubble labeled 2*b*, the user activates the privacy and security mode 136 via the GUI 132. The overriding DNS settings 140 is one of the predetermined DNS settings, and includes the primary IP address 142 "9.9.9.9." Accordingly, the privacy and security engine 130 disregards the default DNS settings 165 and set the recursive resolver 170 for the DNS resolution process equal to the recursive resolver 170(2) that is associated with the IP address 142 "9.9.9.9." Further, as depicted with the bubbled labeled 3*b*, the privacy and security engine 130 transmits the user-configured filtering settings 150 "block malware and social networks" to the recursive resolver 170(2).

As depicted with the bubble labeled 4*b*, the user device 110(2) then transmit the DNS query 175(2) to the recursive resolver 170(2). The DNS query 175(2) requests the IP address 172 of the website "foochat.com." In response, the recursive resolver 170(2) determines that the website "foochat.com" is associated with social networks. Consequently, as depicted with the bubble labeled 5*b*, the recursive resolver 170(2) transmits the DNS response 195(2) "blocked" to the user device 110(2), thereby enforcing the user preferences.

Figure 2:
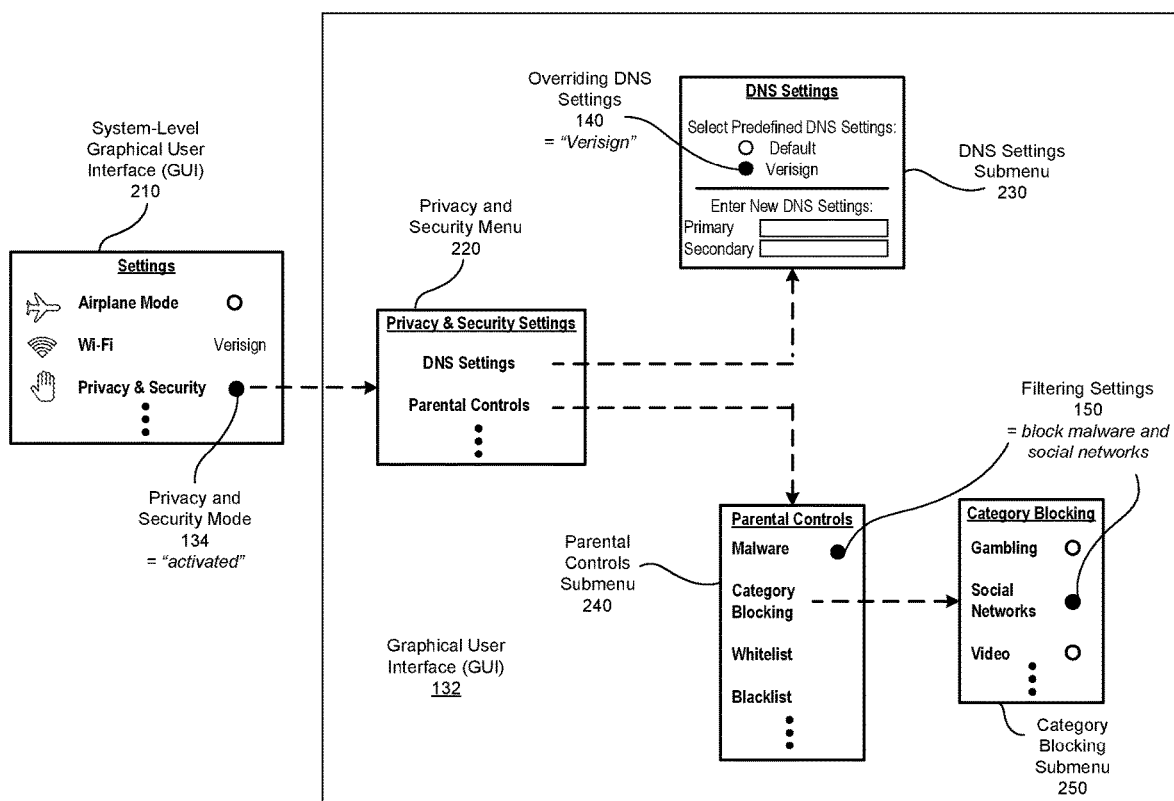
FIG. 2 illustrates an example of the graphical user interface of FIG. 1, according to various embodiments of the present invention.

FIG. 2 illustrates an example of the graphical user interface (GUI) 132 of FIG. 1, according to various embodiments of the present invention. As shown, the GUI 132 is accessed via a "privacy and security" radio button that is included in a system-level GUI 210.

After the user activates the "privacy and security" radio button, the privacy and security engine 130 configures the GUI 132 to display a privacy and security menu 220. The privacy and security menu 220 enables the user to access a DNS settings submenu 230 and a parental controls submenu 240. The DNS settings submenu 230 includes radio buttons that enable the user to set the overriding DNS settings 140 equal to predetermined DNS settings. The DNS settings submenu 230 also includes text entry fields that enable the user to explicitly specify the overriding DNS settings 140. As shown, the user sets the overriding DNS settings 140 equal to the predetermined DNS settings associated with "Verisign."

The parental controls submenu 240 enables the user to block websites that are associated with malware, access a category blocking submenu 250, specify a whitelist, and specify a blacklist. As shown, the user activates malware blocking and accesses the category blocking submenu 250. The category blocking submenu 250 includes a variety of categories. As shown, the user activates a "social networks" radio button that is included in the category blocking submenu 250 to block websites that are associated with social networks. In various embodiments, the privacy and security engine 130 may configure the GUI 132 to display any number and type of widgets that enable the user to specify the filtering settings 150. Further, the recursive resolver 170 may implement the filtering settings 150 in any technically feasible fashion. For example, if a whitelist is specified, then the recursive resolver 170 could be configured to override any of the other filtering settings 150 with the whitelist.

As a result of the depicted user selections, the privacy and security engine 130 sets the recursive resolver 120 for the DNS resolution process to the "Verisign" recursive resolver 170. Further, the privacy and security engine 130 configures the Verisign recursive resolver 170 to implement the filtering settings 150 "block malware and social network" for the DNS queries 175 that are associated with the unique identifier 134.

Directing a DNS Resolution Process

Figure 3:
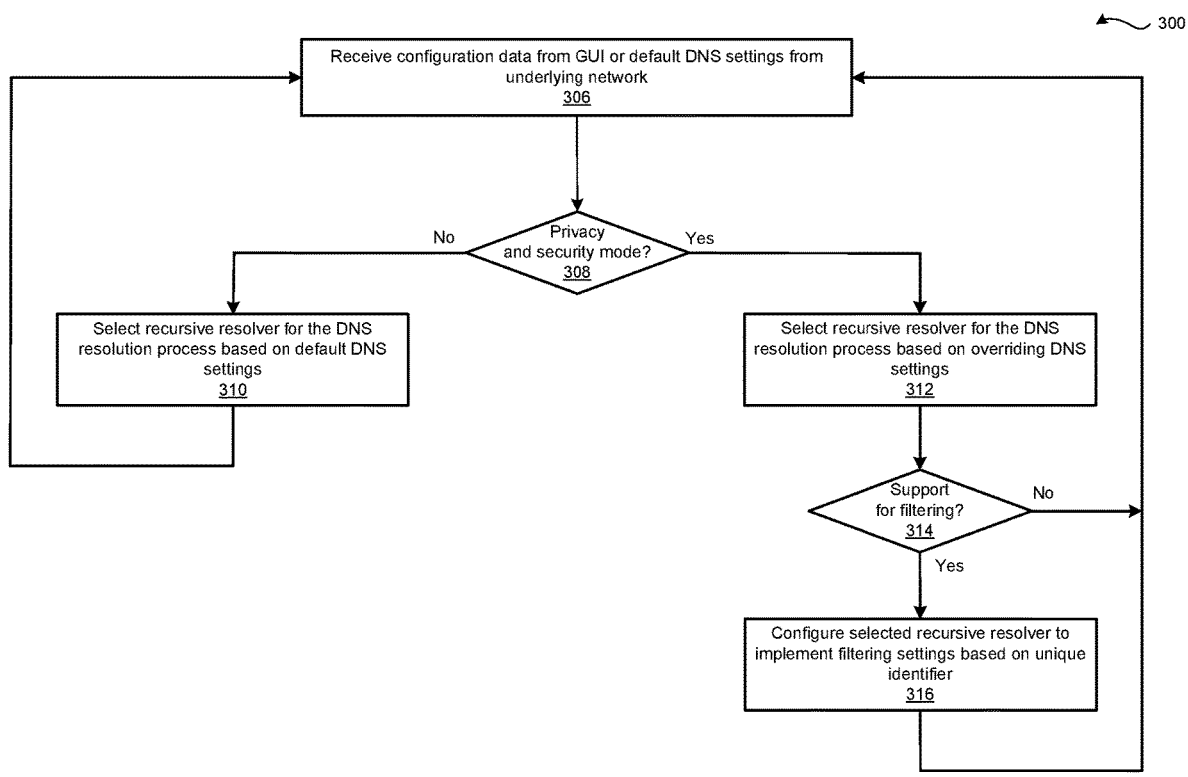
FIG. 3 is a flow diagram of method steps for selecting a recursive resolver for a domain name service (DNS) resolution process, according to various embodiments of the present invention.

FIG. 3 is a flow diagram of method steps for selecting a recursive resolver for a domain name system (DNS) resolution process, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 306, where the privacy and security engine 130 included in a user device 120 receives input data associated with the DNS resolution process. The input data may be configuration data from the GUI 132 included in the privacy and security engine 130 or the default DNS settings 165 from the DNS configuration server 160.

At step 308, the privacy and security engine 130 determines whether the privacy and security mode 136 is activated. If, at step 308, the privacy and security engine 130 determines that the privacy and security mode is not activated, then the method 300 proceeds to step 310. At step 310, the privacy and security engine 130 causes the user device 110 to select the recursive resolver 170 for the DNS resolution process based on the default DNS settings 165.

As part of step 310, the privacy and security engine 130 may request the default DNS settings 165 from the DNS configuration server 160 associated with the underlying network. For example, suppose that the configuration data indicates that the user deactivated the privacy and security mode 136. The privacy and security engine 130 would request the default DNS settings 165 from the DNS configuration server 160 associated with the underlying network. The method 300 then returns to step 306, where the privacy and security engine 130 receives and processes new input data.

If, however, at step 308, the privacy and security engine 130 determines that the privacy and security model 136 is activated, then the method 300 proceeds directly to step 312. At step 312, the privacy and security engine 130 causes the user device 110 to select the recursive resolver 170 for the DNS resolution process based on the overriding DNS settings 140. The privacy and security engine 130 may cause the user device 110 to select the recursive resolver 170 for the DNS resolution process in any technically feasible fashion. For instance, in some embodiments, the privacy and security engine 130 overwrites a protected memory location that stores the default DNS settings 165 with the overriding DNS settings 140.

At step 314, the privacy and security engine 130 determines whether the privacy and security engine 130 is capable of configuring the selected recursive resolver 170 to implement the filtering settings 150. If, at step 314, the privacy and security engine 130 determines that the privacy and security engine 130 is not capable of configuring the selected recursive resolver 170 to implement the filtering settings 150, then the method 300 returns to step 306, where the privacy and security engine 130 receives and processes new input data.

If, however, at step 314, the privacy and security engine 130 determines that the privacy and security engine 130 is capable of configuring the selected recursive resolver 170 to implement the filtering settings 150, then the method 300 proceeds to step 316. At step 316, the privacy and security engine 130 configures the recursive resolver 170 to implement the filtering settings 150 for the DNS requests 175 that are associated with the unique identifier 134. The method 300 then returns to step 306, where the privacy and security engine 130 receives and processes new input data.

The privacy and security engine 130 may determine the unique identifier 134 and cause the recursive resolver 170 to implement the filtering settings 150 based on the unique identifier 134 in any technically feasible fashion. For instance, in some embodiments, the privacy and security engine 130 appends a user name to the IP address 172 associated with the user device 170 to generate the unique identifier 134. The privacy and security engine 130 then transmits the filtering settings 150 and the unique identifier 134 to the selected recursive resolver 170.

The privacy and security engine 130 continues to cycle through steps 306-316, receiving new input data and then selecting the recursive resolver 170 for the DNS resolution process based on the new input data. As the privacy and security engine 130 executes, the user device 110 transmits the DNS queries 175 to the selected recursive resolver 170. In response, the user device 110 receives the DNS responses 195 from the selected recursive resolver 170. In some embodiments, the privacy and security engine 130 may cause the user device 110 to associate the unique identifier 134 with the DNS query 175 prior to transmitting the DNS query 175 to the selected recursive resolver 170. In alternate embodiments, the privacy and security engine 130 or the user device 110 may cause the operating system 120 or any other software application to transmit the DNS queries 175 to the selected recursive resolver 170.

In sum, the disclosed techniques enable users to override the DNS settings provided by underlying networks. In operation, the operating system (OS) of the user device implements a privacy and security engine. The privacy and security engine includes a GUI that allows the user to activate a privacy and security mode, specify overriding DNS settings, and specify filtering settings. When the user activates the privacy and security mode, the privacy and security engine selects the recursive resolver for the DNS resolution process based on the overriding DNS settings. The privacy and security engine then configures the selected recursive resolver to implement any specified filtering settings. Subsequently, the user device transmits DNS queries to the selected recursive resolver, disregarding the DNS settings provided by the underlying network.

Advantageously, the techniques described herein enable a user to select the recursive resolver for the DNS resolution process irrespective of the underlying network. Consequently, the user may select a recursive resolver that complies with user preferences (e.g., performance, privacy, security, etc.) during the DNS resolution process. By contrast, user devices that implement conventional DNS controls are unable to override the DNS settings provided by underlying mobile operator networks. As a result, the recursive resolver that implements the DNS resolution process when a user device that implements conventional DNS controls is connected to an underlying mobile operator network does not necessarily comply with the user preferences.

1. In some embodiments a method for specifying a recursive resolver for a domain name service (DNS) resolution process comprises receiving a first set of DNS settings that is associated with an underlying mobile operator network to which a user device is connected, wherein the first set of DNS settings specifies a first recursive resolver to be implemented as a recursive resolver for a DNS resolution process; and causing the user device to disregard the first set of DNS settings and implement a second set of DNS settings that is associated with an activated privacy and security mode, wherein the second set of DNS settings specifies a second recursive resolver to be implemented as the recursive resolver for the DNS resolution process.
2. The computer-implemented method of clause 1, further comprising receiving a third set of DNS settings that is associated with a new underlying network to which the user device is connected, wherein the third set of DNS settings specifies a third recursive resolver to be implemented as the recursive resolver for a DNS resolution process; and causing the user device to disregard the third set of DNS settings.
3. The computer-implemented method of clauses 1 or 2, wherein the new underlying network comprises an enterprise network or an internet service provider (ISP) network.
4. The computer-implemented method of any of clauses 1-3, further comprising, prior to causing the user device to disregard the first set of DNS settings receiving user input specifying one or more filtering settings that are associated with a first unique identifier corresponding to at least one of a user and the user device; and causing the second recursive resolver to implement the one or more filtering settings based on the first unique identifier.
5. The computer-implemented method of any of clauses 1-4, wherein the one or more filtering settings comprise at least one of malware settings, category settings, a blacklist, and a whitelist.
6. The computer-implemented method of any of clauses 1-5, further comprising causing the user device to associate the first unique identifier with a DNS query prior to transmitting the DNS query to the second recursive resolver.
7. The computer-implemented method of any of clauses 1-6, wherein, in response to the DNS query, the second recursive resolver evaluates the DNS query based on the one or more filtering settings and the first unique identifier to determine that the DNS query is authorized; recursively traverses a DNS hierarchy to translate a domain name specified in the DNS query to a first Internet Protocol (IP) address that complies with the one or more filtering settings to generate a DNS response; and transmits the DNS response to the user device.
8. The computer-implemented method of any of clauses 1-7, wherein, in response to the DNS query, the second recursive resolver evaluates the DNS query based on the one or more filtering settings and the first unique identifier to determine that the DNS query is not authorized; and blocks access to information requested in the DNS query.
9. In some embodiments, a computer-readable storage medium includes instructions that, when executed by a processor, cause the processor to specify a recursive resolver for a domain name service (DNS) resolution process by performing the steps of receiving a first set of DNS settings that is associated with an underlying mobile operator network to which a user device is connected, wherein the first set of DNS settings specifies a first recursive resolver to be implemented as a recursive resolver for a DNS resolution process; and causing the user device to disregard the first set of DNS settings and implement a second set of DNS settings that is associated with an activated privacy and security mode, wherein the second set of DNS settings specifies a second recursive resolver to be implemented as the recursive resolver for the DNS resolution process.
10. The computer-readable storage medium of clause 9, further comprising receiving a third set of DNS settings that is associated with a new underlying network to which the user device is connected, wherein the third set of DNS settings specifies a third recursive resolver to be implemented as the recursive resolver for a DNS resolution process; and causing the user device to disregard the third set of DNS settings.
11. The computer-readable storage medium of clause 9 or 10, wherein the new underlying network comprises an enterprise network or an internet service provider (ISP) network.
12. The computer-readable storage medium of any of clauses 1-11, wherein the second set of DNS settings comprises a primary Internet Protocol (IP) address and a secondary IP address, and disregarding the first set of DNS settings and implementing the second set of DNS settings comprises selecting a server machine that is identified by the primary IP address or the secondary IP address as the recursive resolver for the DNS resolution process.
13. The computer-readable storage medium of any of clauses 1-12, wherein disregarding the first set of DNS settings and implementing the second set of DNS settings comprises performing one or more write operations to store an IP address in a protected memory location that identifies the recursive resolver for the DNS resolution process, wherein the IP address is included in the second set of DNS settings and identifies the second recursive resolver.

14. The computer-readable storage medium of any of clauses 1-13, further comprising, prior to causing the user device to disregard the first set of DNS settings receiving user input specifying one or more filtering settings that are associated with a first unique identifier corresponding to at least one of a user and the user device; and causing the second recursive resolver to implement the one or more filtering settings based on the first unique identifier.

15. The computer-readable storage medium of any of clauses 1-14, wherein the one or more filtering settings comprise at least one of malware settings, category settings, a blacklist, and a whitelist.

16. The computer-readable storage medium of any of clauses 1-15, further comprising, prior to causing the user device to disregard the first set of DNS settings, activating the privacy and security mode based on user input.

17. In some embodiments, a system comprises a memory storing a privacy and security engine; and a processor that is coupled to the memory and, when executing the privacy and security engine, is configured to receive a first set of domain name service (DNS) settings that is associated with an underlying mobile operator network to which a user device is connected, wherein the first set of DNS settings specifies a first recursive resolver to be implemented as a recursive resolver for a DNS resolution process; and cause the user device to disregard the first set of DNS settings and implement a second set of DNS settings that is associated with an activated privacy and security mode, wherein the second set of DNS settings specifies a second recursive resolver to be implemented as the recursive resolver for the DNS resolution process.

18. The system of clause 17, wherein the privacy and security engine further configures the processor to receive a third set of DNS settings that is associated with a new underlying network to which the user device is connected, wherein the third set of DNS settings specifies a third recursive resolver to be implemented as the recursive resolver for a DNS resolution process; and cause the user device to disregard the third set of DNS settings.

19. The system of clauses 18 or 19, wherein the new underlying network comprises an enterprise network or an internet service provider (ISP) network.

20. The system of any of clauses 1-19, wherein the privacy and security engine further configures the processor to, prior to causing the user device to disregard the first set of DNS settings, activate the privacy and security mode based on user input.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
storing, at a user device, a first DNS setting and a second DNS setting, wherein the first DNS setting is associated with a first mode and specifies a first domain name resolver to be implemented as a primary domain name resolver for a domain name resolution process, wherein the second DNS setting is associated with an override mode that overrides the first DNS setting;
determining whether the override mode is currently activated for the user device; and
in response to determining that the override mode is currently activated, causing, at the user device, the second DNS setting to be implemented, wherein the second DNS setting specifies a second domain name resolver to be implemented instead of the first domain name resolver as the primary domain name resolver for the domain name resolution process,
wherein the user device is configured to transmit a domain name query to the first domain name resolver as the primary domain name resolver when the override mode is not currently activated.

2. The computer-implemented method of claim 1, further comprising:
when the override mode is currently activated, if the second domain name resolver is unavailable for a DNS resolution, sending the domain name query to a secondary DNS resolver, wherein the second DNS setting further specifies the secondary DNS resolver.

3. The computer-implemented method of claim 1, further comprising:
receiving, by the user device, the first DNS setting from a Dynamic Host Configuration Protocol (DHCP) server.

4. The computer-implemented method of claim 1, wherein the first DNS setting is associated with an Internet Service Provider (ISP) network or a mobile operator network.

5. The computer-implemented method of claim 4, wherein, while the override mode is activated, the second DNS setting is maintained by the user device when the user device disconnects from the ISP network and connects to the mobile operator network or an other ISP network.

6. The computer-implemented method of claim 1, further comprising: while the override mode is activated, causing, at the user device, a first identifier to be associated with the domain name query prior to sending the domain name query to the second domain name resolver.

7. One or more non-transitory computer readable media storing instructions that, when executed by one or more processors, cause the one or more processors to perform the steps of:
storing, at a user device, a first DNS setting and a second DNS setting, wherein the first DNS setting is associated with a first mode and specifies a first domain name resolver to be implemented as a primary domain name resolver for a domain name resolution process, wherein the second DNS setting is associated with an override mode that overrides the first DNS setting;
determining whether the override mode is currently activated for the user device; and
in response to determining that the override mode is currently activated, causing, at the user device, the second DNS setting to be implemented, wherein the second DNS setting specifies a second domain name resolver to be implemented instead of the first domain name resolver as the primary domain name resolver for the domain name resolution process,
wherein the user device is configured to transmit a domain name query to the first domain name resolver as the primary domain name resolver when the override mode is not currently activated.

8. The one or more non-transitory computer readable media of claim 7, further comprising instructions that, when executed, cause the one or more processors to perform the steps of:
when the override mode is currently activated, if the second domain name resolver is unavailable for a DNS resolution, sending the domain name query to a secondary DNS resolver, wherein the second DNS setting further specifies the secondary DNS resolver.

9. The one or more non-transitory computer readable media of claim 7, further comprising instructions that, when executed, cause the one or more processors to perform the steps of:
receiving, by the user device, the first DNS setting from a Dynamic Host Configuration Protocol (DHCP) server.

10. The one or more non-transitory computer readable media of claim 7, wherein the first DNS setting is associated with an Internet Service Provider (ISP) network or a mobile operator network.

11. The one or more non-transitory computer readable media of claim 10, wherein, while the override mode is activated, the second DNS setting is maintained by the user device when the user device disconnects from the ISP network and connects to the mobile operator network or an other ISP network.

12. The one or more non-transitory computer readable media of claim 7, further comprising instructions that, when executed, cause the one or more processors to perform the steps of:
while the override mode is activated, causing, at the user device, a first identifier to be associated with the domain name query prior to sending the domain name query to the second domain name resolver.

13. A computer system, comprising:
a memory storing instructions; and
a processor configured to execute instructions to:
store, at a user device, a first DNS setting and a second DNS setting, wherein the first DNS setting is associated with a first mode and specifies a first domain name resolver to be implemented as a primary domain name resolver for a domain name resolution process, wherein the second DNS setting is associated with an override mode that overrides the first DNS setting;
determine whether the override mode is currently activated for the user device; and
in response to determining that the override mode is currently activated, cause, at the user device, the second DNS setting to be implemented, wherein the second DNS setting specifies a second domain name resolver to be implemented instead of the first domain name resolver as the primary domain name resolver for the domain name resolution process, and in response to determining that the override mode is not currently activated, transmit a domain name query to the first domain name resolver as the primary domain name resolver.

14. The computer system of claim 13, wherein the processor is configured to further execute instructions to:
send the domain name query to a secondary DNS resolver when the override mode is activated and the second domain name resolver is unavailable for a DNS resolution, wherein the second DNS setting further specifies the secondary DNS resolver.

15. The computer system of claim 13, wherein the processor is configured to further execute instructions to:
receive, by the user device, the first DNS setting from a Dynamic Host Configuration Protocol (DHCP) server.

16. The computer system of claim 13, wherein the first DNS setting is associated with an Internet Service Provider (ISP) network or a mobile operator network.

17. The computer system of claim 16, wherein, while the override mode is activated, the processor is configured to maintain the second DNS setting when the user device disconnects from the ISP network and connects to the mobile operator network or an other ISP network.

18. The computer system of claim 13, wherein the processor is configured to further execute instructions to:
while the override mode is activated, cause, at the user device, a first identifier to be associated with the domain name query prior to sending the domain name query to the second domain name resolver.

19. A computer-implemented method for directing a domain name system (DNS) resolution, comprising:
storing, at a user device, a first DNS setting, wherein the first DNS setting indicates a first DNS resolver to be implemented as a primary DNS resolver for the DNS resolution;
storing, at the user device, a second DNS setting, wherein the second DNS setting is associated with a security mode configured to override the first DNS resolver, wherein the second DNS setting indicates a second DNS resolver to be implemented as the primary DNS resolver for the DNS resolution instead of the first DNS resolver;
determining whether the security mode is currently activated; and
when the security mode is determined to be activated:
overriding the first DNS setting and causing the second DNS setting to be implemented to resolve a DNS query;
sending the DNS query to the second DNS resolver implemented as the primary DNS resolver for the DNS resolution; and
receiving a response to the DNS query from the second DNS resolver,
wherein the second DNS resolver is configured to apply privacy or security settings for resolving the DNS query.

20. The computer-implemented method of claim 19, further comprising:
if the second DNS resolver is unavailable for the DNS resolution, sending the DNS query to a secondary DNS resolver, wherein the second DNS setting further indicates the secondary DNS resolver for the DNS resolution.

21. The computer-implemented method of claim 19, further comprising:
receiving, by the user device, the first DNS setting from a configuration server.

22. The computer-implemented method of claim 21, wherein the configuration server is a Dynamic Host Configuration Protocol (DHCP) server.

23. The computer-implemented method of claim 19, wherein the first DNS setting is associated with a network to which the user device is connected.

24. The computer-implemented method of claim 23, wherein the network comprises an Internet Service Provider (ISP) network or a mobile operator network.

25. The computer-implemented method of claim 24, wherein, while the security mode is activated, the second DNS setting is maintained by the user device when the user device disconnects from the ISP network and connects to the mobile operator network or an other ISP network.

26. The computer-implemented method of claim 19, further comprising:
if the second DNS resolver is unavailable for the DNS resolution, sending the DNS query to a secondary DNS resolver.

27. The computer-implemented method of claim 19, further comprising, when the security mode is determined to be activated:
generating the DNS query with a unique identifier, wherein the unique identifier is configured to cause the second DNS resolver to apply privacy and security settings for resolving the DNS query.

28. The computer-implemented method of claim 27, wherein a stub resolver for the user device is configured to generate and send the DNS query.

29. The computer-implemented method of claim 19, wherein the second DNS resolver is configured to process the DNS query by determining whether the DNS query corresponds to a whitelisted network resource or a blacklisted network resource.

30. The computer-implemented method of claim 19, wherein the second DNS resolver is configured to process the DNS query based on a unique identifier associated with the user device.

31. The computer-implemented method of claim 19, wherein the security mode specifies one or more filter settings associated with a first identifier corresponding to at least one of a user or the user device; and
causing the second DNS resolver to implement the one or more filter settings based on the first identifier.

32. The computer-implemented method of claim 31, wherein the one or more filter settings comprise at least one of a malware setting, a category setting, a privacy setting, a performance setting, a blacklist, or a whitelist.

33. The computer-implemented method of claim 31, further comprising: causing, at the user device, the first identifier to be associated with the DNS query prior to sending the DNS query to the second DNS resolver.

34. The computer-implemented method of claim 31, wherein, in response to the DNS query, the second DNS resolver is configured to:
evaluate the DNS query based on the one or more filter settings and the first identifier to determine whether the DNS query is authorized;
recursively traverse a DNS hierarchy to translate a domain name specified in the DNS query to a first Internet Protocol (IP) address that complies with the one or more filter settings to generate the response; and
transmit the response to the user device.

35. The computer-implemented method of claim 31, wherein, in response to the DNS query, the second DNS resolver is configured to:

evaluate the DNS query based on the one or more filter settings and the first identifier to determine that the DNS query is not authorized; and block access to information requested in the DNS query.

36. The computer-implemented method of claim 31, wherein the user device includes a graphical user interface (GUI) comprising a button for a user to activate the security mode.

37. One or more non-transitory computer readable media storing instructions that, when executed by one or more processors, cause the one or more processors to perform the steps of:

storing, at a user device, a first DNS setting, wherein the first DNS setting indicates a first DNS resolver to be implemented as a primary DNS resolver for DNS resolution;

storing, at the user device, a second resolution setting, wherein the second re solution setting is associated with a security mode configured to override a default mode, wherein the second resolution setting indicates a second DNS resolver to be implemented as the primary DNS resolver for DNS resolution instead of the first DNS resolver;

determining, at the user device, whether the security mode is activated; and when the security mode is determined to be activated:
causing the second resolution setting to be implemented, by overriding the default mode, to resolve a DNS query;

sending the DNS query to the second DNS resolver indicated as the primary DNS resolver for DNS resolution; and receiving a response to the DNS query from the second DNS resolver, wherein the second DNS resolver is configured to apply privacy or security settings for resolving the DNS query.

38. The one or more non-transitory computer readable media of claim 37, further comprising instructions that, when executed, cause the one or more processors to perform the steps of:

if the second DNS resolver is unavailable for the DNS resolution, sending the DNS query to a secondary DNS resolver, wherein the second DNS setting further indicates the secondary DNS resolver for the DNS resolution.

39. The one or more non-transitory computer readable media of claim 37, further comprising instructions that, when executed, cause the one or more processors to perform the steps of:

receiving, by the user device, the first DNS setting from a configuration server.

40. The one or more non-transitory computer readable media of claim 39, wherein the configuration server is a Dynamic Host Configuration Protocol (DHCP) server.

41. The one or more non-transitory computer readable media of claim 37, wherein the first DNS setting is associated with a network to which the user device is connected.

42. The one or more non-transitory computer readable media of claim 41, wherein the network comprises an Internet Service Provider (ISP) network or a mobile operator network.

43. The one or more non-transitory computer readable media of claim 42, wherein, while the security mode is activated, the second DNS setting is maintained by the user device when the user device disconnects from the ISP network and connects to the mobile operator network or an other ISP network.

44. The one or more non-transitory computer readable media of claim 37, further comprising instructions that, when executed, cause the one or more processors to perform the steps of:

if the second DNS resolver is unavailable for the DNS resolution, sending the DNS query to a secondary DNS resolver.

45. The one or more non-transitory computer readable media of claim 37, further comprising instructions that, when executed, cause the one or more processors to perform the steps of:

when the security mode is determined to be activated:
generating the DNS query with a unique identifier, wherein the unique identifier is configured to cause the second DNS resolver to apply privacy and security settings for resolving the DNS query.

46. The one or more non-transitory computer readable media of claim 45, wherein a stub resolver for the user device is configured to generate and send the DNS query.

47. The one or more non-transitory computer readable media of claim 37, wherein the second DNS resolver is configured to process the DNS query by determining whether the DNS query corresponds to a whitelisted network resource or a blacklisted network resource.

48. The one or more non-transitory computer readable media of claim 37, wherein the second DNS resolver is configured to process the DNS query based on a unique identifier associated with the user device.

49. The one or more non-transitory computer readable media of claim 37, wherein the security mode specifies one or more filter settings associated with a first identifier corresponding to at least one of a user or the user device; and further comprising instructions that, when executed, cause the one or more processors to perform the steps of:

causing the second DNS resolver to implement the one or more filter settings based on the first identifier.

50. The one or more non-transitory computer readable media of claim 49, wherein the one or more filter settings comprise at least one of a malware setting, a category setting, a privacy setting, a performance setting, a blacklist, or a whitelist.

51. The one or more non-transitory computer readable media of claim 49, further comprising instructions that, when executed, cause the one or more processors to perform the steps of:

causing, at the user device, the first identifier to be associated with the DNS query prior to sending the DNS query to the second DNS resolver.

52. A computer system, comprising:
a memory storing instructions; and
a processor that executes the instructions to:
store, at a user device, a first DNS setting, wherein the first DNS setting indicates a first DNS resolver to be implemented as a primary DNS resolver for a DNS resolution;

store, at the user device, a second DNS setting, wherein the second DNS setting is associated with a security mode configured to override the first DNS resolver, wherein the second DNS setting indicates a second DNS resolver to be implemented as the primary DNS resolver for the DNS resolution instead of the first DNS resolver;

determine whether the security mode is currently activated; and when the security mode is determined to be activated:
   override the first DNS setting and cause the second DNS setting to be implemented to resolve a DNS query;
   send the DNS query to the second DNS resolver implemented as the primary DNS resolver for the DNS resolution; and
   receive a response to the DNS query from the second DNS resolver,
   wherein the second DNS resolver is configured to apply privacy or security settings for resolving the DNS query.

53. The computer system of claim 52, wherein the processor is configured to further execute instructions to:
   if the second DNS resolver is unavailable for the DNS resolution, send the DNS query to a secondary DNS resolver, wherein the second DNS setting further indicates the secondary DNS resolver for the DNS resolution.

54. The computer system of claim 52, wherein the processor is configured to further execute instructions to:
   receive, by the user device, the first DNS setting from a configuration server.

55. The computer system of claim 54, wherein the configuration server is a Dynamic Host Configuration Protocol (DHCP) server.

56. The computer system of claim 52, wherein the first DNS setting is associated with a network to which the user device is connected.

57. The computer system of claim 56, wherein the network comprises an Internet Service Provider (ISP) network or a mobile operator network.

58. The computer system of claim 57, wherein the processor is configured to further execute instructions to:
   while the security mode is activated, maintain the second DNS setting by the user device when the user device disconnects from the ISP network and connects to the mobile operator network or an other ISP network.

59. The computer system of claim 52, wherein the processor is configured to further execute instructions to:
   if the second DNS resolver is unavailable for the DNS resolution, send the DNS query to a secondary DNS resolver.

60. The computer system of claim 52, wherein the processor is configured to further execute instructions to:
   when the security mode is determined to be activated:
   generating the DNS query with a unique identifier, wherein the unique identifier is configured to cause the second DNS resolver to apply privacy and security settings for resolving the DNS query.

61. The computer system of claim 60, wherein a stub resolver for the user device is configured to generate and send the DNS query.

62. The computer system of claim 52, wherein the second DNS resolver is configured to process the DNS query by determining whether the DNS query corresponds to a whitelisted network resource or a blacklisted network resource.

63. The computer system of claim 52, wherein the second DNS resolver is configured to process the DNS query based on a unique identifier associated with the user device.

64. The computer system of claim 52, wherein the security mode specifies one or more filter settings associated with a first identifier corresponding to at least one of a user or the user device; and the processor is configured to further execute instructions to:
   cause the second DNS resolver to implement the one or more filter settings based on the first identifier.

65. The computer system of claim 64, wherein the one or more filter settings comprise at least one of a malware setting, a category setting, a privacy setting, a performance setting, a blacklist, or a whitelist.

66. The computer system of claim 64, wherein the processor is configured to further execute instructions to:
   cause, at the user device, the first identifier to be associated with the DNS query prior to sending the DNS query to the second DNS resolver.

67. The computer system of claim 64, wherein, in response to the DNS query, the second DNS resolver is configured to:
   evaluate the DNS query based on the one or more filter settings and the first identifier to determine whether the DNS query is authorized;
   recursively traverse a DNS hierarchy to translate a domain name specified in the DNS query to a first Internet Protocol (IP) address that complies with the one or more filter settings to generate the response; and
   transmit the response to the user device.

68. The computer system of claim 64, wherein, in response to the DNS query, the second DNS resolver is configured to:
   evaluate the DNS query based on the one or more filter settings and the first identifier to determine that the DNS query is not authorized; and
   block access to information requested in the DNS query.

69. The computer system of claim 64, wherein the user device includes a graphical user interface (GUI) comprising a button for a user to activate the security mode.

* * * * *